UNITED STATES PATENT OFFICE.

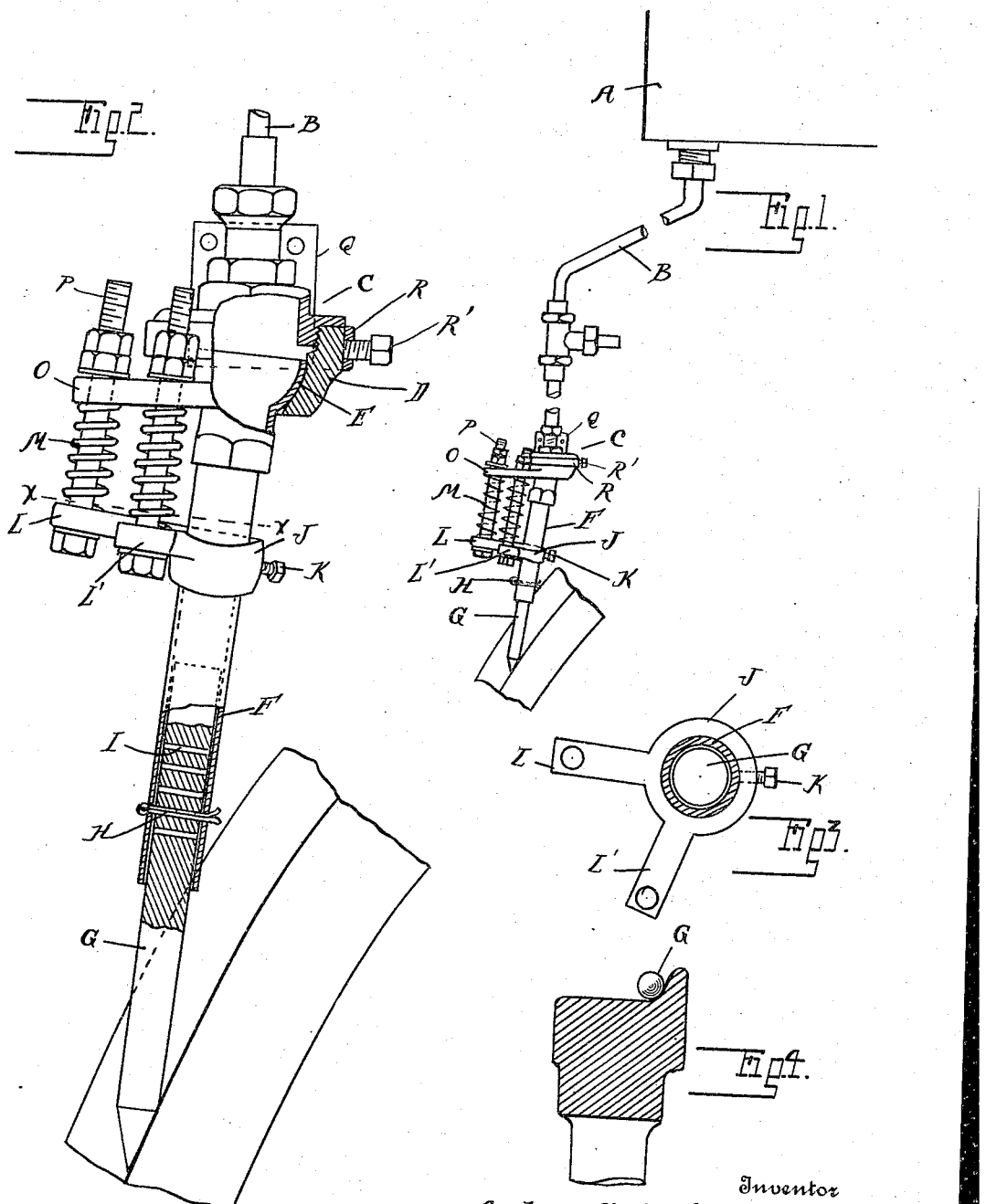

ANDREW G. MACHESNEY, OF DETROIT, MICHIGAN, ASSIGNOR TO DETROIT LUBRICATOR COMPANY, OF DETROIT, MICHIGAN, A CORPORATION OF MICHIGAN.

FLANGE-LUBRICATOR.

1,185,222.

Specification of Letters Patent.

Patented May 30, 1916.

Application filed April 5, 1915. Serial No. 19,326.

*To all whom it may concern:*

Be it known that I, ANDREW G. MACHESNEY, a citizen of the United States of America, residing at Detroit, in the county of Wayne and State of Michigan, have invented certain new and useful Improvements in Flange-Lubricators, of which the following is a specification, reference being had therein to the accompanying drawings.

The invention relates to lubricating devices for the flanges of track wheels, and has particular reference to the means employed for directing the lubricant to the desired point upon the flange regardless of the relative movement or vibration of the frame with respect to the wheel.

In the present state of the art lubricating devices for locomotive wheels have been provided, in which the lubricator is supported upon the engine frame and the discharged lubricant is directed to the flange by a shoe riding upon said flange and connected to the discharge conduit. Such a construction is objectionable on account of the considerable range of vibration or relative movement of the engine frame and wheel and requires the use of the shoe guide in addition to the lubricator and its discharge conduit. With the present invention the device is simplified by dispensing with the shoe and providing means upon the lubricator for maintaining the discharge conduit in fixed relation to the flange.

In the drawings: Figure 1 is an elevation showing a lubricating device in its relation to the flange of a wheel. Fig. 2 is an enlarged view partly in section of the guide or feeder; Fig. 3 is a section on line $x$—$x$ of Fig. 2; and Fig. 4 is a cross section through the flange of the wheel showing the relation of the feeder thereto.

A is the lubricator, which is supported upon the engine frame (not shown), and which is provided with a discharge conduit B. The specific form of the lubricator forms no part of the present invention and further description of the same is therefore omitted.

C is a universal coupling connected into the discharge conduit B and which, as shown, comprises a spherical socket member D and a ball member E in engagement therewith.

F is a tubular discharge conduit suspended from the ball member E, and G is a guide or feeder loosely coupled in the tube F by suitable means, such as a cotter pin H.

Adjustment is provided for the wear of the feeder by a series of holes I in the shank thereof, with any one of which a cotter may be engaged.

The point most advantageous for the reception of the oil is the curve or fillet of the wheel flange intermediate the tread and the outwardly-extending portion of the flange. To hold the feeder in contact with this point regardless of the relative movement of the engine and wheel, I have provided resiliently yieldable means for pressing the feeder thereagainst. As shown, this comprises a collar J adjustably secured upon the tube F by suitable means, such as the set-screw K, said collar being provided with angling ears L L' extending laterally therefrom. These ears form bearings for springs M, the opposite ends of which abut against lugs O upon the socket member D, and adjustable safety bolts P on which said springs are sleeved hold the same from displacement and operate to limit the angular adjustment. If desired, the socket member D may be held in fixed position upon the frame by a bracket Q having a ring R which embraces the socket member D and is secured thereto by a set screw R'.

With the device constructed as described, by properly adjusting the collar J the springs M may be tensioned so that their yieldable pressure upon the ears L and L' will rock the tube F and feeder G carried thereby to hold the point of the latter in the fillet of the wheel flange. This will direct the lubricant passing through the tube F down the feeder G and upon the fillet of the wheel flange, where centrifugal action will distribute it outward over the wheel flange. As the point of the feeder wears adjustment may be made by detaching the cotter pin H and engaging the same with another hole in the shank of the feeder. Thus by this simple construction the location of the discharge of lubricant upon the flange is maintained constant.

What I claim as my invention is:—

1. In a flange lubricator, the combination with the discharge conduit for the lubricant, of a guide or feeder for the lubricant from said conduit to the wheel flange, having a universal pivotal coupling with the former, and resilient means coöperating with said coupling for holding said guide in fixed position upon said flange.

2. In a flange lubricator, the combination with the discharge conduit for the lubricant, of an extension thereof, a universal pivotal coupling between said extension and said discharge conduit, a guide or feeder connected to said extension and leading to the wheel flange, and resilient means coöperating with said coupling for holding said guide or feeder in contact with said flange.

3. In a flange lubricator, the combination with a discharge conduit for the lubricant, of an extension for said conduit, a universal pivotal coupling between said conduit and extension, a guide or feeder loosely fitting said extension and leading to the flange of the wheel, means for longitudinally adjustably connecting said guide or feeder to said extension, and means for resiliently holding said guide or feeder against said flange.

4. In a flange lubricator, the combination with the discharge conduit, of a guide or feeder for the lubricant extending to the wheel flange, a universal pivotal coupling between said guide and said conduit, and a pair of springs coöperating with said universal coupling to resiliently press said guide or feeder with its free end in contact with the fillet of the wheel flange.

5. In a flange lubricator, the combination with a discharge conduit for the lubricant, of a feeder rod inserted in said conduit and bearing against the fillet of the flange, and means for longitudinally adjustably securing said feeder rod to said conduit.

6. In a flange lubricator, the combination with a tubular discharge conduit, of a feeder rod loosely engaging the end of said conduit and bearing with its opposite end against the fillet of the flange, means for resiliently yieldably pressing said feeder rod against said fillet, and a cotter pin alternatively engageable with a series of apertures in said feeder rod and registering apertures in said conduit for adjusting the length of said feeder to compensate for wear.

7. In a flange lubricator, the combination with a discharge conduit, of a feeder, and a plurality of means upon said discharge conduit acting in different directions for yieldably pressing said feeder against the fillet of the wheel flange.

8. In a flange lubricator, the combination with the discharge conduit, of a guide or feeder for the lubricant connected to said conduit and extending to the wheel flange, and a pair of springs acting at an angle to each other, for pressing said guide or feeder with its free end in contact with said wheel flange.

9. In a flange lubricator, the combination with the discharge conduit, of a guide or feeder for the lubricant connected to said conduit and extending to the wheel flange, a pair of springs acting at an angle to each other, for pressing said guide or feeder with its free end in contact with said wheel flange, and means for holding said springs from displacement and for limiting the angular adjustment of the guide or feeder.

10. In a flange lubricator, the combination with the discharge conduit, of a guide for the lubricant extending to the wheel flange, a universal pivotal coupling between said guide and conduit, comprising ball and socket members, said members being connected to the respective guide and conduit, a collar having angling ears upon said guide, lugs upon the member connected to the conduit, and springs between said ears and lugs for maintaining the guide with its free end against the fillet of the wheel flange.

11. In a flange lubricator, the combination with the discharge conduit, of a guide for the lubricant extending to the wheel flange, a universal pivotal coupling between said guide and conduit, comprising ball and socket members, said members being connected to the respective guide and conduit, a collar having angling ears upon said guide, lugs upon the member connected to the conduit, springs between said ears and lugs for maintaining the guide with its free end against the fillet of the wheel flange, and bolts extending from said ears to said lugs upon which said springs are sleeved.

In testimony whereof I affix my signature in presence of two witnesses.

ANDREW G. MACHESNEY.

Witnesses:
HENRIETTA E. BOWMAN,
JAMES P. BARRY.

Copies of this patent may be obtained for five cents each, by addressing the "Commissioner of Patents, Washington, D. C."